(12) United States Patent
Al Watban (10) Patent No.: US 8,490,422 B2
(45) Date of Patent: Jul. 23, 2013

(54) EVAPORATIVE AIR COOLER WITH MULTI STAGES COOLING AND OR HEATING WITH OR WITHOUT COOLING COIL

(76) Inventor: Alaa Abdulkareem Al Watban, Riyadh (SA)

( * ) Notice: Subject to any disclaimer, the term of this patent is extended or adjusted under 35 U.S.C. 154(b) by 683 days.

(21) Appl. No.: 12/767,292

(22) Filed: Apr. 26, 2010

(65) Prior Publication Data
US 2010/0281896 A1 Nov. 11, 2010

(51) Int. Cl.
*G05D 22/00* (2006.01)
*F25B 49/00* (2006.01)

(52) U.S. Cl.
USPC ........... 62/176.6; 62/259.4; 62/274; 236/44 C (58) Field of Classification Search
USPC ............. 62/121, 150, 171, 176.6, 259.4, 274, 62/304; 236/44 C
See application file for complete search history.

(56) References Cited

U.S. PATENT DOCUMENTS

| | | | |
|---|---|---|---|
| 3,965,690 A * | 6/1976 | Berryhill | 62/121 |
| 4,300,623 A | 11/1981 | Meckler | |
| 5,884,492 A * | 3/1999 | Zwicky et al. | 62/91 |
| 6,385,987 B2 | 5/2002 | Schlom | |
| 2007/0101746 A1 | 5/2007 | Schlom | |

* cited by examiner

*Primary Examiner* — Marc Norman
(74) *Attorney, Agent, or Firm* — Roylance, Abrams, Berdo & Goodman, L.L.P.

(57) ABSTRACT

An outdoor air cooler with two stages includes a first stage for cooling and humidification with constant wet bulb temperature. The air cooler has a first stage pump circulating water over the first stage evaporative cooling media operating at conditions having a constant adiabatic wet bulb temperature line. The first stage tank is supplied with water from external source. The second stage includes a second set of evaporative cooling media using water from the first stage media, which is equal to or lower than outdoor air wet bulb temperature. The temperature of air leaving the second stage evaporative media follows the adiabatic wet bulb temperature line toward the second stage tank water temperature thereby cooling humidifying the treated air to stable wet and dry bulb temperatures.

11 Claims, 10 Drawing Sheets

Desert Cooler General Outlook

EVAPORATIVE AIR COOLER WITH MULTI STAGES COOLING AND OR HEATING WITH OR WITHOUT COOLING COIL

CROSS-REFERENCE TO RELATED APPLICATIONS

This application claims the benefit under 35 U.S.C. §119 of Saudi Arabian Patent Application Nos. 109300247 and 109300248, filed Apr. 26, 2009, which are hereby incorporated by reference in their entirety.

FIELD OF THE INVENTION

The present invention relates to a direct, water evaporative-type desert cooler with optional cooling coil and heating coils. In particular, the invention relates to a water evaporative type desert cooler that can provide supply air with dry bulb and wet bulb temperature close or lower than outdoor air wet bulb temperature.

BACKGROUND OF THE INVENTION

There are a number of different methods for cooling a flowing stream of air. Indirect evaporative cooling invented in the mid-seventies (see, for example, Schlom, et al., U.S. Pat. Nos. 4,023,949 and 6,385,987) uses the latent heat of the evaporation of water to remove heat from the air.

Direct evaporative coolers on the other hand, also known as swamp coolers, cool the air by passing the air through wet pads by which the evaporative absorption of the latent heat of evaporation by the water directly cools the air. Since the water vapor evaporates directly into the air, the air ends up with a high moisture content.

With direct refrigeration, incoming hot air passes through a heat exchanger where a refrigerant composition, such as Freon, absorbs heat from the air and evaporates. The latent heat of evaporation of the refrigerant acts on the air through a heat exchanger to cool the air. To recycle the refrigerant, additional energy is used to compress and condense the refrigerant vapor back to a liquid, which can then be returned to the intake of the heat exchanger and evaporated again in a regular cycle.

There are two notable differences between indirect evaporative cooling and direct refrigeration. The first is that indirect evaporation evaporates water instead of Freon in the heat exchanger. The second is that the water vapour in indirect evaporative cooling is not recaptured and condensed back to the liquid state as is Freon in direct refrigeration.

Evaporative cooling is especially well suited for climates where the air is hot, humidity is low and where the energy demands of refrigerative cooling are impractical. Evaporative air conditioning is popular and well suited to desert and desert-like regions.

In dry, arid climates, the installation and operating cost of an evaporative cooler can be much lower than refrigerative air conditioning, often by 80% or so. However, evaporative cooling and vapor-compression air conditioning are sometimes used in combination to yield optimal cooling results. Some evaporative coolers may also serve as humidifiers in the heating season.

In locations with moderate humidity, there are many cost-effective uses for evaporative cooling. For example, industrial plants, commercial kitchens, laundries, dry cleaners, greenhouses, spot cooling (loading docks, warehouses, factories, construction sites, athletic events, workshops, garages, and kennels) and confinement farming (poultry ranches, hog, and dairy) all often employ evaporative cooling. In highly humid climates, evaporative cooling may have little thermal comfort benefit beyond the increased ventilation and air movement it provides.

Residential or commercial building air conditioners face special challenges when operated in environments having airborne sand, salt, and dust. Narrow flow channels for liquids and/or air for direct or indirect heat exchange in conventional air cooling units can quickly become clogged and fouled with airborne debris which can materially affect the efficiency and operation of the cooling unit.

Conventional desert coolers uses large water tank and one or more submersible pumps inside tank pumping and dripping water over Evaporative cooling media honeycomb cellulose cells or hass type. Some of the problems of conventional evaporative air coolers are as follows:

- It is not possible for such units to supply air equal to outdoor air wet bulb temperature as it need to be at 100% saturation which may not be comfortable for human also may not be suitable for most applications.
- An unstable supply air temperature due to fluctuations of the tank water temperature.
- Supply air temperature depend on the water temperature in the tank, since water tank is the base and external body of the unit which increase water temperature in tank higher than the outdoor wet bulb temperature.
- Salt problem causing fast media clogging, also corrosion of body and internal parts like fan, and pump continues failure.
- Conventional desert coolers are continuously accumulating unhealthy dirty dust with high dirt and salt concentration water inside tank.
- To directly cool supply water or tank water to a temperature less than outdoor wet bulb require high cooling capacities.

SUMMARY OF THE INVENTION

This patent involves a direct water evaporative type desert Air cooler with optional cooling coil and heating coil, The invention relates to water evaporative type desert cooler that can provide supply air with dry bulb and wet bulb temperature close or lower than outdoor air wet bulb temperature and as follows:

- The first stage for cooling and humidification by passing outdoor hot air on the first row of evaporative cooling Media, water is pumped and dripped or spray over evaporative media from first stage water tank. Make up water for first stage tank comes from source.
- The second stage cooling and humidification; air leaving first stage evaporative media enters a second row of evaporative cooling media with separate second stage pump and second stage water tank, water is pumped and dripped or spray over evaporative media from second stage water tank, make-up water for this tank comes directly from the water leaving first stage media which is equal or lower than outdoor air wet bulb temperature. Second stage tank is small and insulated. On psychometric chart air entering first stage media shall follow a constant adiabatic line. Water temperature in second stage tank is always stable and close or lower than outdoor wet bulb temperature. Air leaving second stage media shall follow the line toward the water temperature in second stage tank, resulting in a stable cooling and humidifying air.
- Additional various sizes of refrigeration or chilled water cooling coil is used inside the second stage tank to reduce the water temperature lower than dew point of air leaving the first stage evaporative cooling media. The temperature of air leaving the second stage evaporative media shall follow the line toward the second stage tank water temperature, cooling and dehumidifying air to a lower wet bulb and dry bulb temperatures than outdoor air wet bulb conditions.

First and second stage Evaporative cooling media are with various thickness and evaporative efficiencies.

Uses two tanks; second stage tank inside the first stage tank (or separated), connected by the water distribution chamber, tanks are small in size and isolated from external device body.

Water leaving first stage evaporative cooling media is collected in collection pans then directed to either distribution chambers or direct to the tanks.

Uses two stage heating; first stage water Heaters inside first stage tank to improve humidification, while the second stage uses Air duct type heaters located at discharge outlet of supply air fan so device can continued to be used in winter for humidification and heating.

An electrical control circuit with room thermostat is used for room or space cooling, ventilating, and or heating control.

An automatic drainage system consisting of motorized drain valve connected with photo sensor operating upon morning sun light of the day. Water can be totally or partially drained as desired using a time delay relay device.

External device body was insulated to minimize heat load from external surrounding air.

A washable aluminium air filter was added in front of cooling media to pre-filter air prior to entering the device.

BRIEF DESCRIPTION OF THE DRAWINGS

The features of the invention can also be described through the attached drawings

FIG. 4 Shows a front elevation, and section detailing the device, fan, motor, air cooled condenser, refrigerant compressor, package air cooling coil unit, water basin or tanks, pumps & electrical control compartment.

DETAILED DESCRIPTION OF THE INVENTION

Most conventional evaporative air coolers depend on humidification with constant wet bulb temperature or constant adiabatic line with a single stage cooling and single water tank, resulting in unstable supply air temperate. The present invention uses the constant adiabatic process at first stage cooling up to the desired relative humidity then uses the second stage to stabilize supply air temperature by stabilizing water tank temperature. The second stage also reduces the wet bulb and dry bulb temperatures, depending on the desired capacity of cooling coil. The present invention has a number of features and advantages that can be seen in the attached drawing figures:

Tanks are Isolated from External Body:

Our device have two separate water tanks isolated from external body, a second stage tank inside the first stage tank (or separated), connected by the water distribution chambers.

Supply Air is at a Lower Temperature in Summer:

The device depends on two stages of cooling and humidification and as follows:

First Stage: cooling and humidification with constant wet bulb temperature, the device have first stage pump connected to the first stage tank circulating water over the first stage evaporative cooling media cooling and humidify the air passes through follow a constant adiabatic wet bulb temperature line, the condition of leaving air depending on media thickness and efficiency. First stage tank is supplied with water from external source through float ball valve.

Second Stage: cooling with humidification, the second stage tank embedded inside the first stage tank both tanks are connected by distribution chambers so water is free to move between tanks, second stage tank is connected to a second stage pump circulating water over a second row of evaporative cooling media, make-up water for this tank comes directly from the water leaving first stage media which is equal or lower than outdoor air wet bulb temperature. The temperature of air leaving the second stage evaporative media shall follow the line toward the second stage tank water temperature, cooling and humidifying air to a stable wet bulb and dry bulb temperatures.

Additional cooling with dehumidification, the second stage tank with cooling coil (refrigeration or chilled water type). Various sizes of refrigeration or chilled water cooling coil is used inside the second stage tank to reduce the water temperature lower than dew point (or higher) of air leaving the first stage evaporative cooling media. The temperature of air leaving the second stage evaporative media shall follow the line toward the second stage tank water temperature, cooling and dehumidifying air to a lower wet bulb and dry bulb temperatures than outdoor air wet bulb conditions.

Supply Air for Heating and Humidification in Winter:

During heating, supply fan shall be at low fan speed, with the first stage water pump dripping or spraying water over first stage evaporative media. Electric water heating element is inserted inside the first stage water tank for heating water temperature to increase humidification efficiency of air passing through the first stage media, while a second stage electric air heaters located downstream from supply fan for second stage heating of air, size of heater is as per space requirements.

Tanks Cleaning:

Water drainage pipe with motorized drain valve is connected to first stage tank to drain water from first and second stage tanks. Valve actuator is controlled to open and drain water by electrical photo sensor activated upon sun rise and is automatically opened for few pre set minutes after sun rise daily to drain fully or partially tank water.

Insulation and Sealing of Unit:

Device external body and supporting structure are all double sandwich panel using poly-Styrofoam and polyurethane foam insulating materials, to improve external body overall coefficient of heat transfer. Also all joints are sealed with rubber foam gaskets to minimize air leakage. All insulating and sealing result in providing colder supply air than conventional desert coolers.

Air Filtration:

Aluminium washable Air filter was added to prevent dust from interring the space during device operation or shout down.

Figure 1:
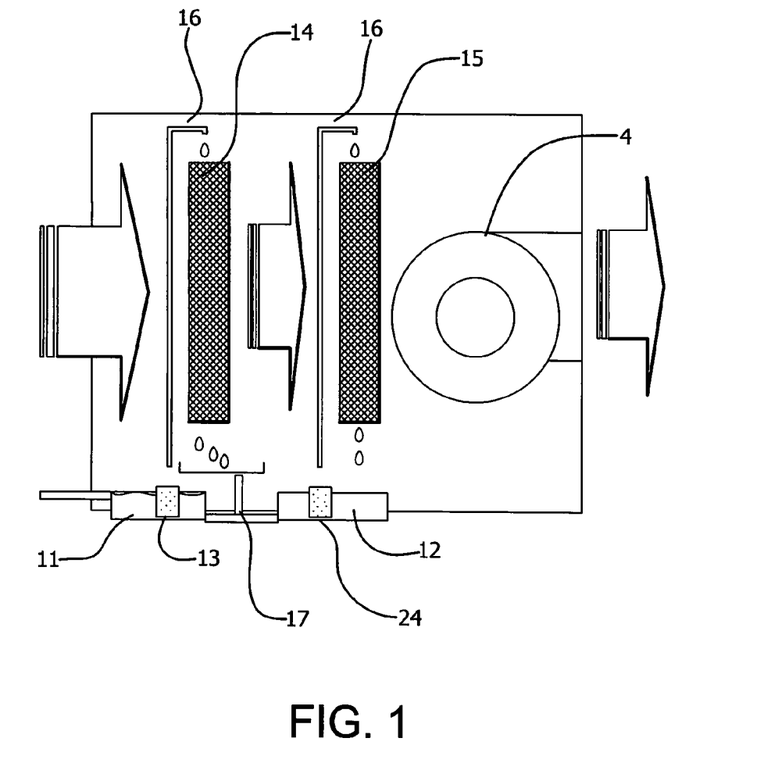
FIG. 1 shows air and water flow diagram of the device, hot and dry outdoor air pass through the first stage evaporative cooling media to cool and humidify the air. The air then passes into contact with second evaporative media for further cooling and humidifying. The sketch shows that make up water comes from an external source to the first water tank while the makeup water for the second tank comes from the cold water leaving the first stage evaporative media.
Figure 2:
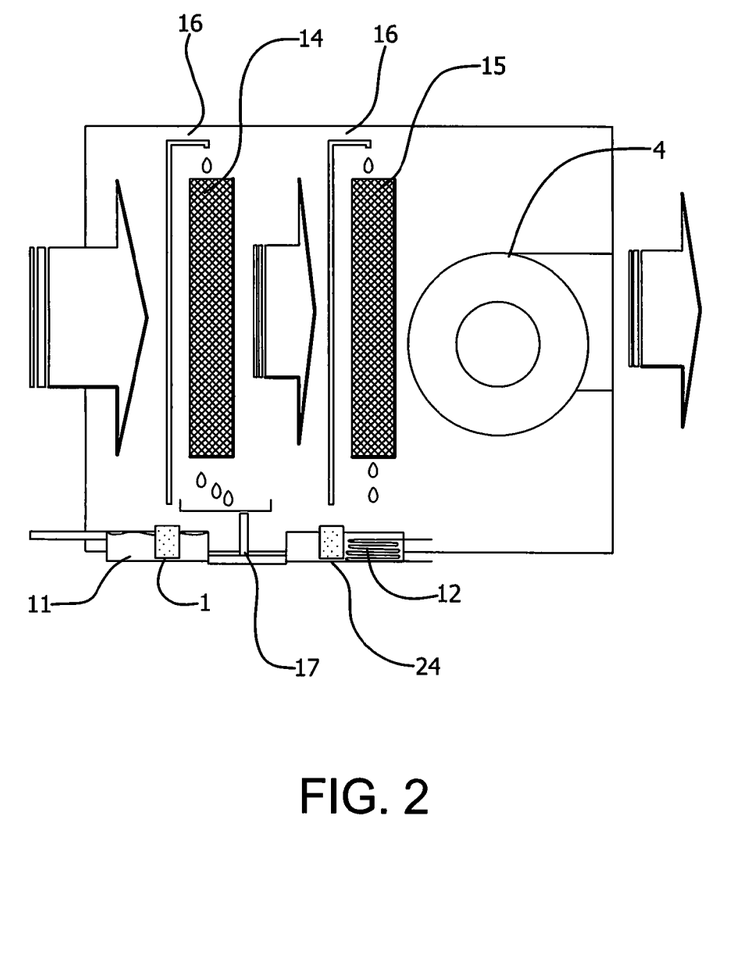
FIG. 2 is a sketch showing an air and water flow diagram of the device with a cooling coil immersed in the second stage tank. This coil can cool the water in the second tank to a temperature that is lower than the dew point of air leaving the first stage media and thereby cool and dehumidify the air passing through the second stage media to a temperature lower than outdoor air wet bulb temperature.
Figure 3:
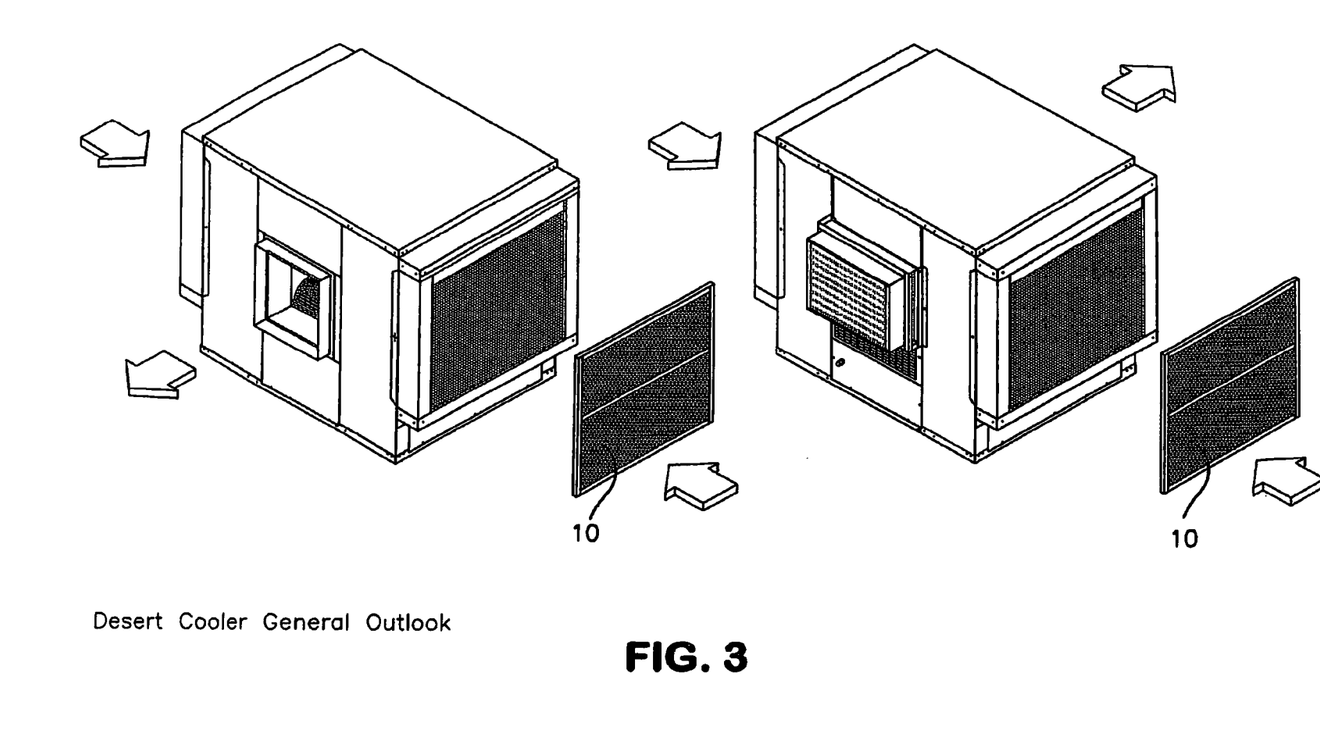
FIG. 3 Shows showing the general and external body of unit.
Figure 4:
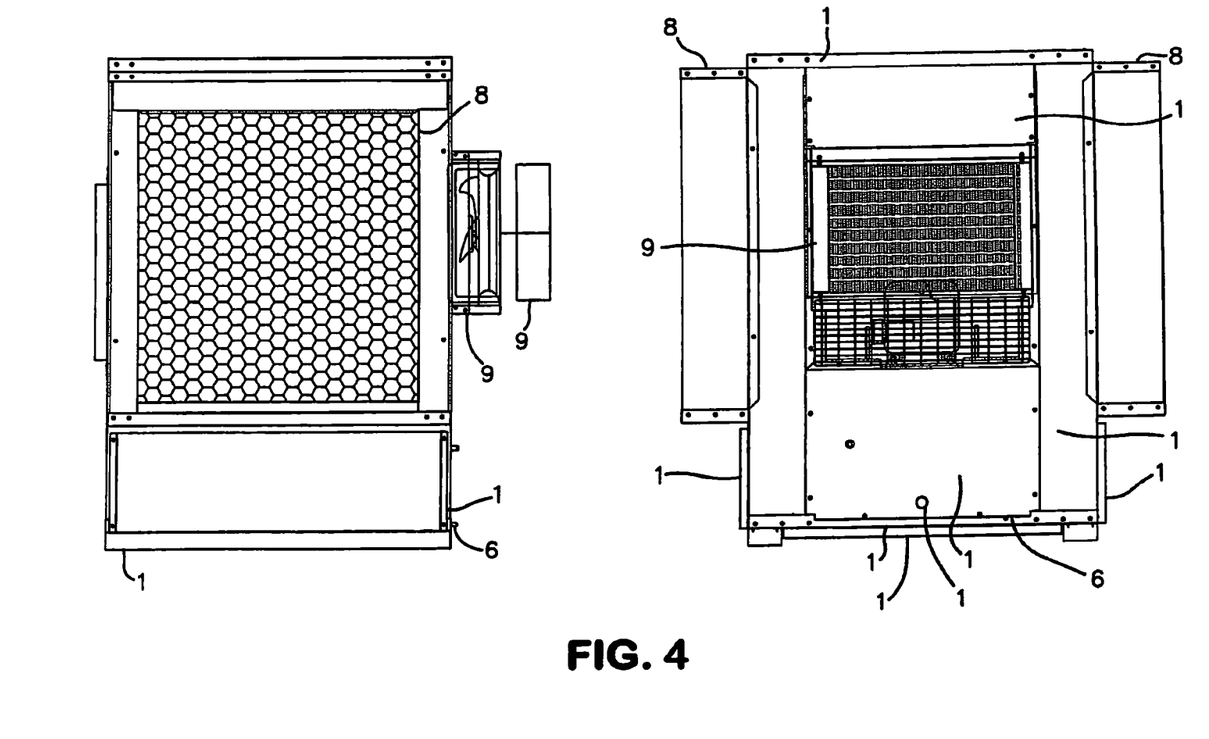
FIG. 4 Illustrates showing left and front elevations.
Figure 5:
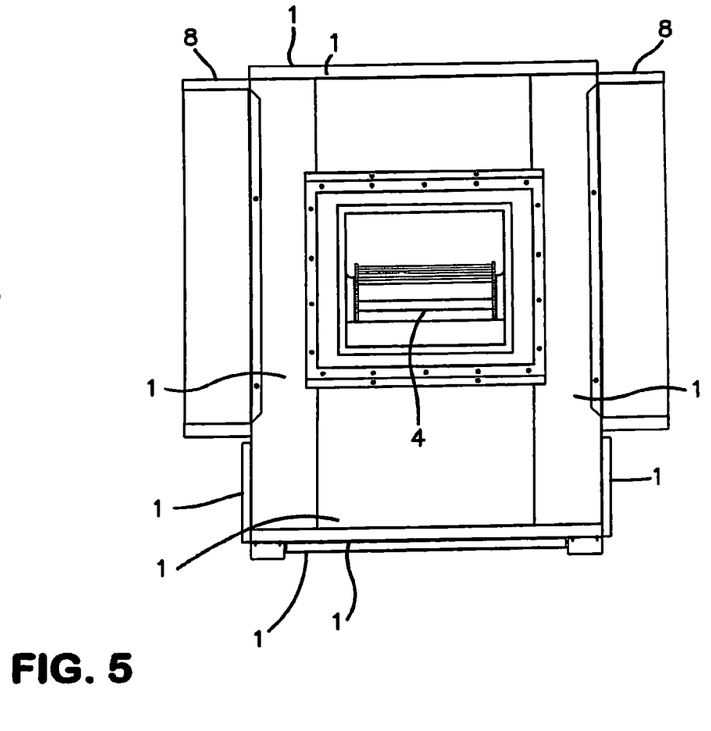
FIG. 5 Depicts right and rear elevations.
Figure 6:
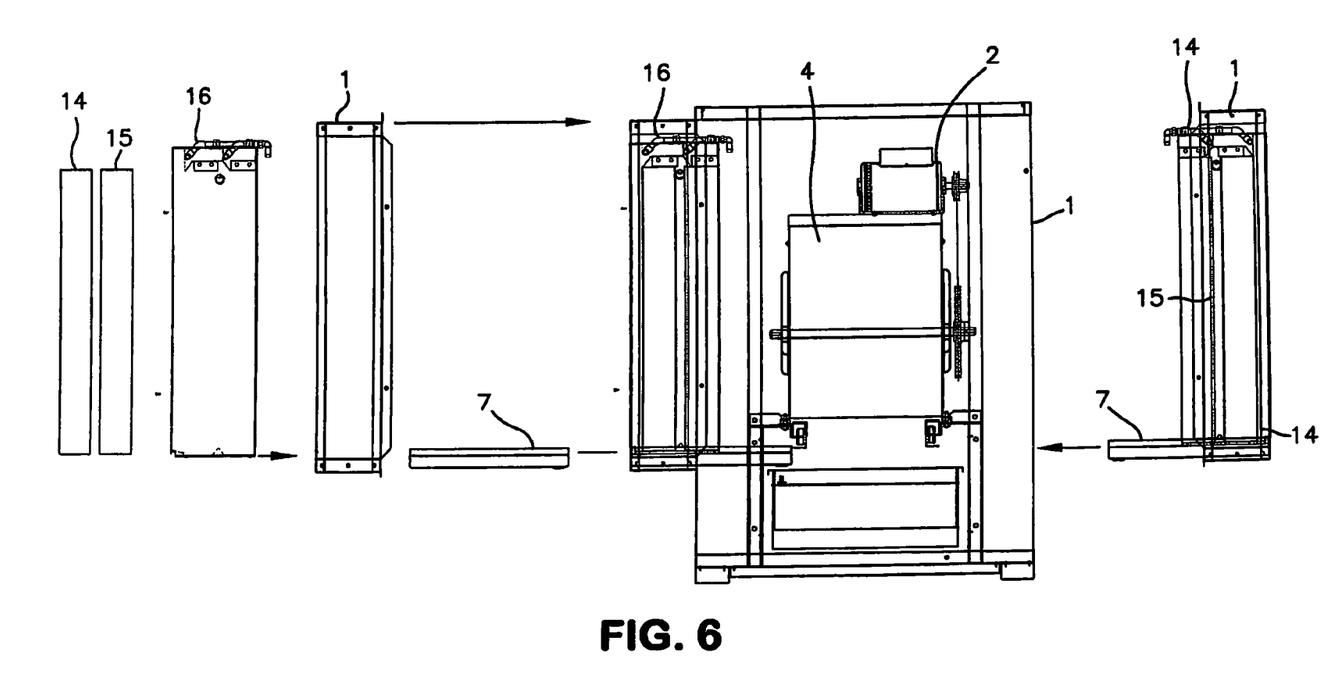
FIG. 6 Shows section internal device details, showing main frames, main supporting members, fan, and motor. Also Evaporative cellulose cells Assembly, showing media external body, drip pan, distribution nozzles, and collection pans.
Figure 7:
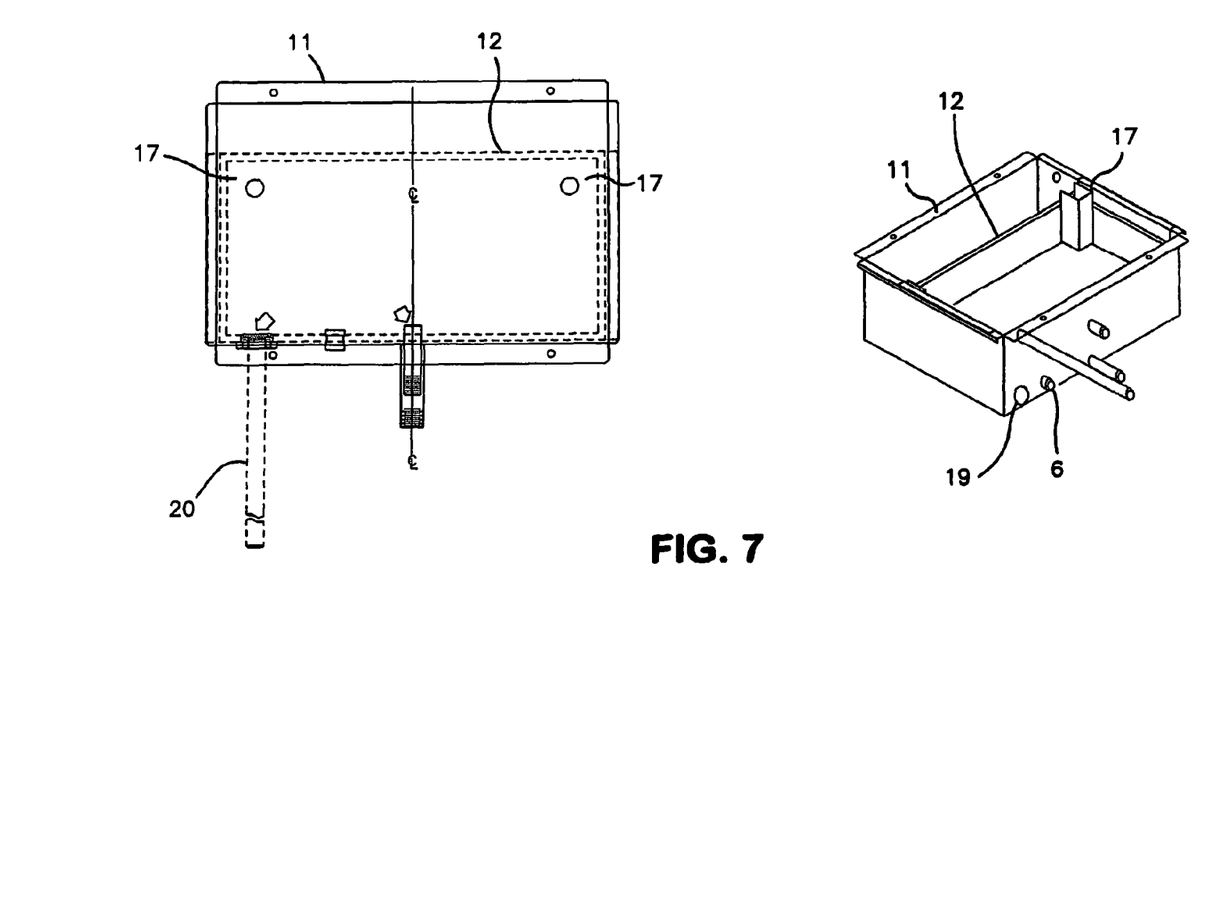
FIG. 7 Provides top and isometric views detailing the first and second stage water tank or basin details.
Figure 8:
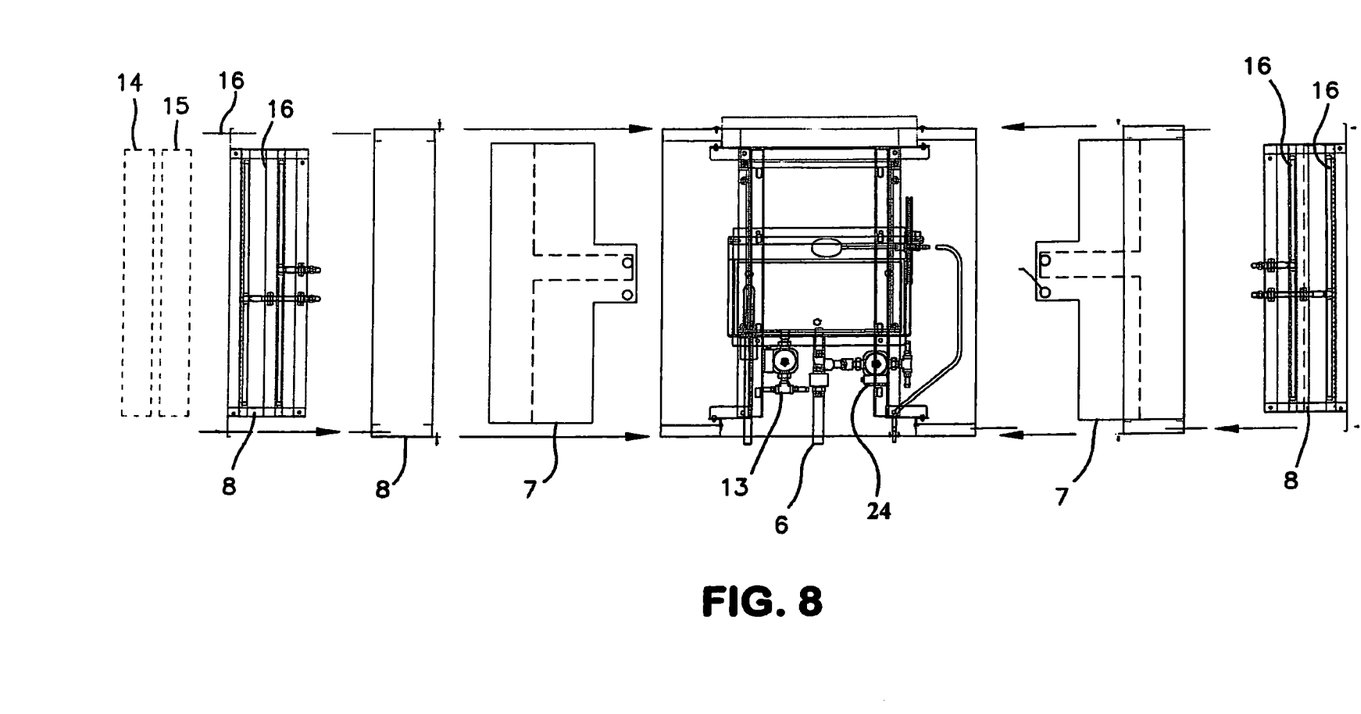
FIG. 8 is a drawing that shows the media assembly compartment, water spray nozzles, first and second stage water collection pans, first and second stage water pumps, water drainage motorized valve, cooling coil, condenser, condenser fan and motor and compressor.
Figure 9:
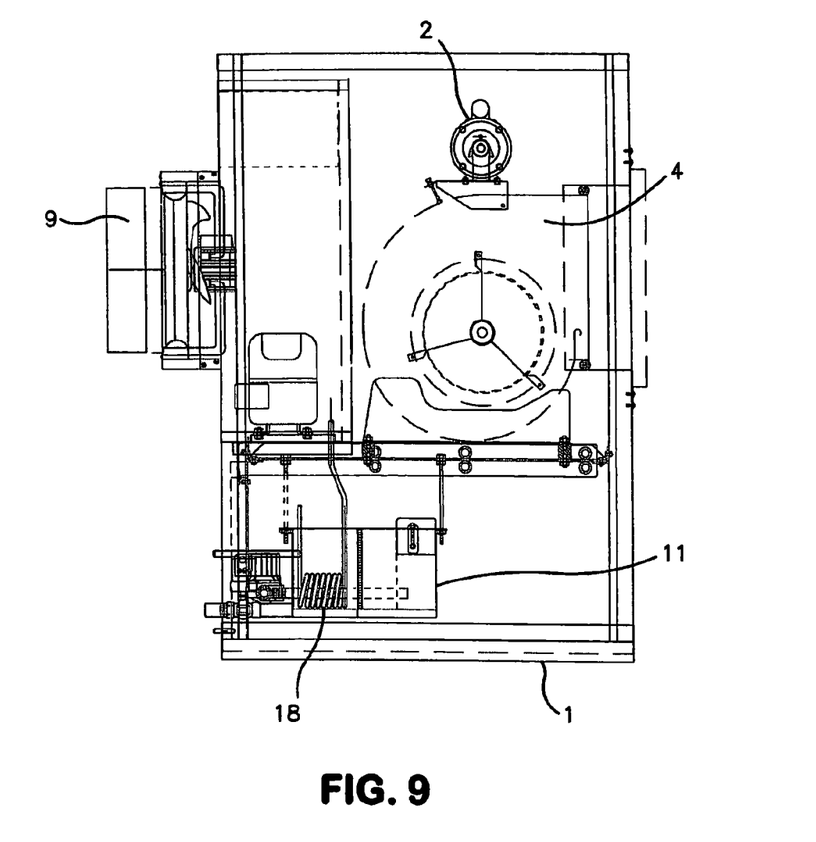
FIG. 9 is a drawing that shows the right side section, external body, motor, blower, package air cooling coil unit, water tanks and cooling coil.
Figure 10:
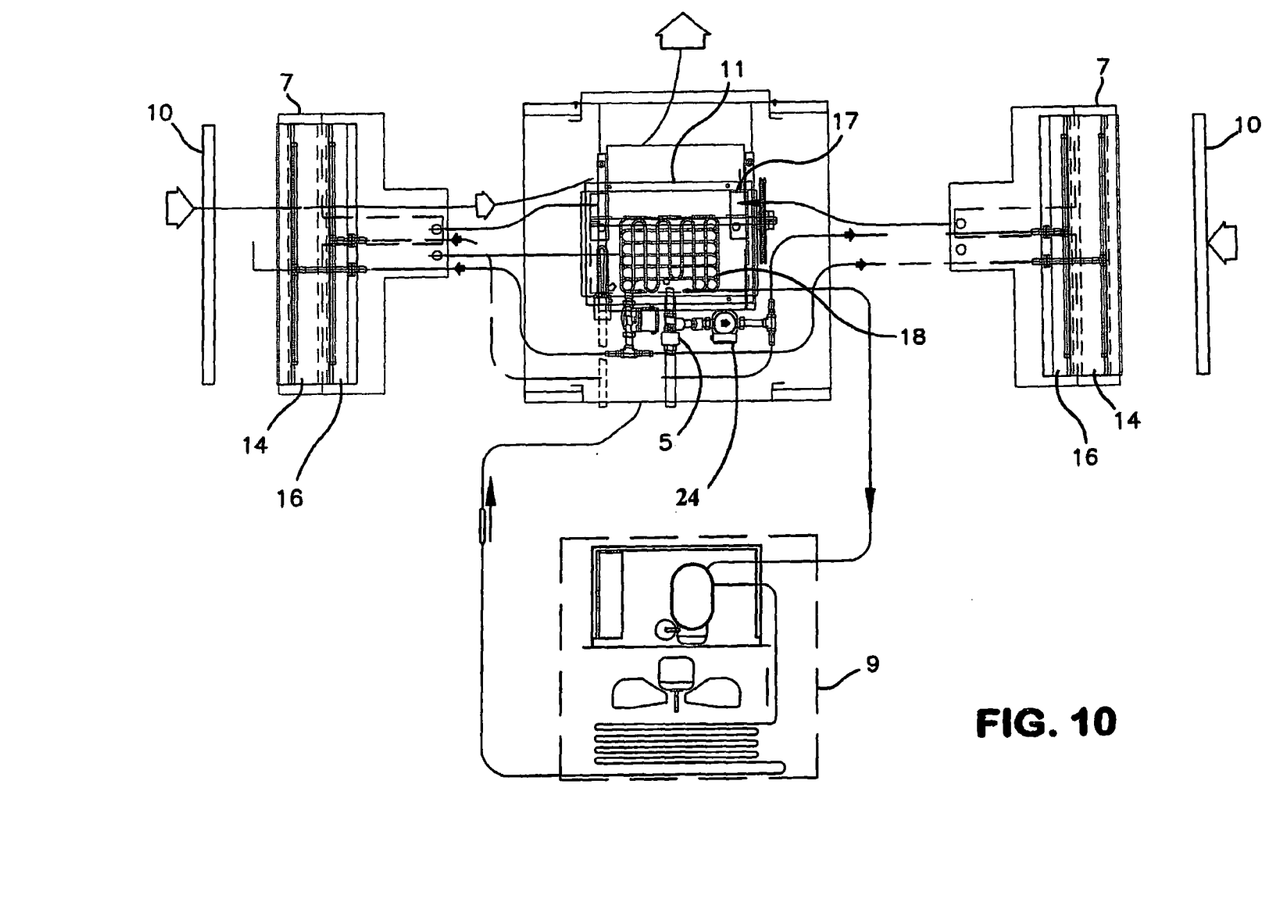
FIG. 10 is a schematic system diagram of the device with cooling coil.

Device was Designed and Manufactured as Per Patent, and as Per Attachment Drawings Consist of the Following Parts:

- Device Structure: Unit manufactured from different thickness of galvanized steel sheets as per item No. 1, shown in FIGS. (3), (4), (5), (6) & (9) All external structure are sandwich panel insulated with Styrofoam and polyurethane foam insulating materials.
- Aluminium Air Filters: washable type aluminium air filters used in front of media compartments as per item No. 10, shown in FIGS. (3) & (10), also sand trap lover can be added in front of aluminium filters when required.
- Fan: as per item No. 4, centrifugal type belt driven similar to package air-conditions, mounted on rubber type vibration isolator as shown in FIGS. (5), (6) & (9).
- Motor: as per item No. 2, mounted on fan housing with variable pitch motor pulley and V-belt drive as shown in FIGS. (6) & (9). Our desert coolers equipped with single or multiple speed fan motor or motor with variable frequency drives or speed regulator for models with specified pre adjusted fan speed or 2 fans for models with supply air flow modulations.
- Cooling Media Assembly compartment: as per item No. 8, shown in FIGS. (3), (4), (5), (6), (8) & (10) shows left and right cooling media assembly compartments consisting of first and second stage Evaporative cooling media item No. 14 & 15 of honeycomb cellulose cells or hass with various thickness and evaporative efficiencies, also showing water distribution headers, drip pans, collection pans, and external steel frames.
- Water Tanks assembly compartment: shown in FIGS. (7), (9), &(10), manufactured from galvanized steel, hard plastic, or Fiberglas. Tanks assembly consist of first stage large tank item No. 11, and another smaller size second stage tank item No. 12, embedded or attached, also with two small water distribution chambers (or other means) so as water leaving first stage evaporative media enter these chambers to the second stage tank and first stage tank. First stage cooling tank makeup water from source through a floating ball valve. Tank provided with water filter at inlet pipe to first and second stage water pumps. Two water distribution champers at left and right receiving water from first stage media distribute water to first and second stage tank. First stage tank bottom sloped toward a drainage pipe.
- Water Collection pans: manufactured from steel, hard plastic, or Fiberglas sloped collection trays is design to collect water from first and second stage cooling media, and directing water to distribution chambers or second stage water tank, FIGS. (6), (8) & (10) shows the collection pans as per item No. 7 for left and right side of evaporative cooling media, pans are divided so as to separate water from first stage and direct it to distribution chambers, while water from second stage is directed to second stage tank.
- Water circulating pumps: device is equipped with inline or end section type pumps as per FIGS. (8), (9) & (10), to eliminate electrical shock as in the case of submersible pumps, Each pump with different water capacity (litter/min) depending on the evaporative cooling media thickness and efficiency. Our pumps capable of handling high water temperatures during heating mode. First stage pumps item No. 13, and second stage pumps item No. 24, outlets are connected with flexible tubes to deliver water to media assembly compartment water distribution headers.
- Motorized Water Drainage Valve: Item No. 5, as shown in FIGS. (8), & (10), motorized drain valve connected on water drain pipe item No. 6 of first stage tank to drain water from first and second stage tanks. Valve actuator is controlled to open to drain water and close by electrical photo sensor activated upon sun rise and is automatically opened for few pre set minutes then close daily to drain fully or partially tank water.
- Cooling Coil: Our unit use plain cooper tube or other non corrosion materials as an evaporative cooling coil which can work with our packaged air cooled chilled water unit as shown in item No. 18, FIGS. (9) & (10). Also our cooling coil can be connected to chilled water supply from other external chilled water source.
- Packaged Air Cooled Chilled Water Unit: our packaged air cooled chilled water unit designed for our desert cooler and consist of cold water cooling coil section as per item No. 18, FIGS. (9) & (10), and package air cold condensing section as per item No. 9, FIGS. (4), (5, & (9). Water cooling coil section is equipped with direct expansion device to work with our air cold condensing section, or equipped with two or three way motorized valve to work with chilled water supply from external source. Air cold condensing section consist of refrigerant compressor, air cold condensing coil and condenser fan motor, refrigeration copper tube, low refrigeration pressure control, low limit water temperature control and standard over current protection.
- Room Thermostat: Conventional room thermostats with 2 stages cooling and 2 stages heating are selected to be used as room or space temperature controller sending low voltage signals to electrical control circuits in control compartment to operate the device in sequences as below:
- Electrical Control Circuit and Sequences of Operation: Our device desert cooler's electrical control characteristic design is to provide various operation modes suitable to individual user preferences through the room thermostat switch selections. Once the electrical power supply and domestic water are connected to the unit, our desert coolers are ready to operate.
  FAN switch: "OFF", COOL/HEAT MODE-switch: "OFF":—

For the above switch positions, the sequence of operation is as follows:

Our Room Thermostat with Fan switch: "OFF" position, and Temperature Control switch: "OFF" position 1. If room thermostats with "OFF" switch positions are selected, all controllers' components of the Desert Cooler control compartment are neutralized; none of the supply fan or fans, water pumps or electrical heaters is activated.

FAN switch: "Manual", COOL/HEAT MODE-switch: "OFF":—

For the above switch positions, the sequence of operation is as follows:

1. Supply fan operate within 180 second (or as pre set time) after the switch is pressed and the control circuit of the device allow the fan (or fans) to run on "Lo" speed (optional high). In this particular mode, no water pump circulates water to the evaporative media and supply fan continues to operate regardless the room thermostat set point.

FAN switch: "Manual", COOL/HEAT MODE-switch: "Cool":—

For the above switch position, the sequence of operation is as follows:

1. In case room or occupied space temperature is in the ranges of +/−1 degree Fahrenheit of thermostat set point, Our thermostat's call for $1^{st}$ stage cooling signals the control circuit of the device to run the $1^{st}$ stage water pump which start after 120 seconds (or as pre set time) also calls for supply fan on "Lo" (or optional high) speed within 180 second (or as pre set time) once the "Cool" switch are pressed.
2. Further rise of room or space temperature +1.5 degree Fahrenheit (or as pre set) above thermostat set point, $2^{nd}$ stage call for cooling signals the control circuit of the device to energize $2^{nd}$ stage water pump starting circulate colder water from $2^{nd}$ stage water tank flushing over $2^{nd}$ stage evaporative media along with starting the operation of direct expansion air cooled chilled water unit attached on the frontal main frames of our desert coolers or allow the external chilled water supply to cooling coil.
3. Supply fan in this "Manual" & "Cool" mode is designed to run only on "Lo" speed (or optional high).
4. Decline of room or space temperature below 1.5 degree Fahrenheit (or as pre set) of thermostat set point, no more cooling required and no cooling signal from room thermostat, control circuit of the device stop $1^{st}$ stage water pump, allow only supply fan to continue on "Lo" (or optional high) speed. Supply fan in this particular mode continue in operation regardless the room thermostat's set point.
5. Our desert coolers in this switch positions operate satisfactory during the mild weather season whereas the rooms or occupied space not required substantial cooling, the air entering the areas are primarily cleaned by cleanable aluminium pre filter supplied with the device.

FAN switch: "Auto", COOL/HEAT MODE-switch: "Cool":—

For the above switch position, the sequence of operation is as follows:

1. In case room or occupied space temperature is in the ranges of +/−1 degree Fahrenheit of thermostat set point, our thermostat's call for $1^{st}$ stage cooling signals the control circuit of the device to run the $1^{st}$ stage water pump which start after 120 seconds (or as pre set time) also calls for supply fan on "Lo" (or optional high) speed within 180 second (or as pre set time) once the "Cool" switch are pressed.
2. Further rise of room or space temperature 1.5 degree Fahrenheit (or as pre set) above thermostat set point, $2^{nd}$ stage call for cooling signals the control circuit of the device to energize $2^{nd}$ stage water pump starting circulate colder water from $2^{nd}$ stage water tank flushing over $2^{nd}$ stage evaporative media along with starting the operation of direct expansion air cooled chilled water unit attached on the frontal main frames of our desert coolers or allow the external chilled water supply to cooling coil.
3. Supply fan in this $2^{nd}$ stage of "Auto & Cool" mode cooling demand is designed to transfer from "Lo" speed to running on "Hi" speed (or operate a second fan).
4. Decline of room or space temperature below 1 degree Fahrenheit of thermostat set point (or as pre set), no more cooling required and no cooling signal from room thermostat, control circuit of the device stop the supply fan, allow only $1^{st}$ stage water pump to flushing water over $1^{st}$ stage evaporative media continuously. $1^{st}$ stage water pump in this particular mode continue in operation regardless the room thermostat's set point.
5. For above item 11, The continues operation of $1^{st}$ stage water pump during the fan stop period is intended to provide filtration and humidification to air entering through our device in compensation for room or space exhausted air.
6. Optional to above item 11 for cooling mode, $1^{st}$ stage water pump can also be designed to stop with the supply fan.

FAN switch: "Auto", COOL/HEAT MODE-switch: "Heat":—

For the above switch position, the sequence of operation is as follows:

1. Our desert coolers are capable to operate in cold season similar to air conditioning units. The devices furnished with $1^{st}$ stage water heating elements mainly for humidification and $2^{nd}$ stage factory mounted electric heater or field installed electric duct heaters for the purposes of heating the supply air.
2. During mild weather or cold season, room temperature may fall below the set point of room thermostat, whenever the switch is pressed on "Heat" and the thermostat detects room temperature is in the ranges of +/−1 degree Fahrenheit, $1^{st}$ stage call for heating signals the control circuit of the device to switch on $1^{st}$ stage water pump which start after 120 seconds (or as pre set time) to circulating water from $1^{st}$ stage water tank flushing over $1^{st}$ stage evaporative media, also start the fan on "Lo" speed (or pre set speed) which start after 180 seconds (or as pre set time), meanwhile energized water heating elements immersed in $1^{st}$ stage water tank to heat up water to a certain degree resulting in entering air higher humidity level.
3. Our desert cooler control circuits designed to allow immersed water heating elements in active maintaining water temperature to a design 120 to 140 degree Fahrenheit (or as pre set) even after room temperature is satisfied.
4. Further decline of room or space 1.5 degree Fahrenheit (or as pre set) below room thermostat set point, $2^{nd}$ stage call for heating signals the devices control circuit to switch on $2^{nd}$ stage electrical air heater immediately to increase supply air temperature to a designed temperature and deliver to the room or spaces.
5. Supply fan in this "Auto" & "Heat" mode is designed to run only on "Lo" speed (or pre set speed).
6. In case room temperature satisfied the thermostat set point, the fan stop, $1^{st}$ stage water heating elements and $1^{st}$ stage pump continue circulating hot water flushing over $1^{st}$ stage evaporative media in the same manner as "Auto" and "Cool" in summer season.
7. Optional to above item 19 for heating mode, $1^{st}$ stage water pump can also be designed to stop with the supply fan.

FAN switch: "Manual", COOL/HEAT MODE-switch: "Heat":—

For the above switch position, the sequence of operation is as follows:
1. Desert Cooler in these switch positions are designed to operate in similarity to the operations of units with switches positioned on "AUTO" & "HEAT" except once the space's temperature is maintain at the set point, 1st. stage water pump stop, leaving only supply fan to continue it's operation on "Lower" fan speed even after room temperature set point is satisfied.
2. Desert Cooler in these switch positions operate satisfactory during the mild weather season whereas the occupied areas or rooms not require substantial heating. The air entering the areas are primarily cleaned by our cleanable aluminium pre filters supplied with the unit.

Safety Devices & Protections
1. Our Desert Coolers and electrical control compartment factory furnished with the following safety devices:
a. Low limit water level controller to switch off all pumps and motors in case of water supply shortages.
b. Low voltage Auto Drains system with 24 v. drain water valve to daily draining certain quantity of salt concentrated water in Desert Cooler water tank.
c. Photo-electric switch to energize auto drain system few minutes after the sun rise.
d. 5 minutes Auto-time Delay prevents manually rapid adjustment of Room temperature which preventing frequencies "ON & OFF" compressor recycling.
e. All circulating water pumps of our desert coolers are inline centrifugal or end suction pumps externally installed to the cold water tanks or amerceable ac or dc water pumps.
f. All electrical components of our desert coolers are properly provided with over current or thermal protections.
g. Aluminium pre filter filtering outdoor air before entering desert cooler evaporative Cellulose media.
h. Low limit water temperature control protection to prevent water freezing.
i. Low refrigeration pressure control protection.

What is claimed is:
1. An air cooler for cooling and humidifying outdoor air with two stages of cooling and humidification comprising:
a first stage for cooling and humidification with constant wet bulb temperature, the air cooler having a first stage pump connected to a first stage tank circulating water over the first stage evaporative cooling media cooling and humidifying the air passing through following a constant adiabatic wet bulb temperature line, the condition of leaving air depending on media thickness and efficiency;
said first stage tank being supplied with water from external source;
a second stage for cooling with humidification, said second stage including an insulated tank or non-insulated tank embedded inside the first stage tank or in separated tanks, said tanks being connected by distribution chambers or other means so water is free to move between said tanks;
said second stage tank being served by an independent second pump circulating water on a second row of evaporative cooling media, make-up water for said tank supplied directly from water leaving first stage media which is equal or lower than outdoor air wet bulb temperature;
said temperature of air leaving the second stage evaporative media following the line toward the second stage tank water temperature, cooling humidifying air to a stable wet bulb and dry bulb temperatures.

2. An air cooler according to claim 1, wherein said second stage comprises a:
tank having a cooling coil disposed therein, and
the first and second water tanks are connected by distribution chambers so that water is free to move between tanks,
second stage tank is served by an independent second pump circulating water on a second row of evaporative cooling media,
make-up water for the second stage tank comes directly from the water leaving first stage media which is equal or lower than outdoor air wet bulb temperature.

3. The air cooler according to claim 1, wherein cooling, ventilation, humidification and heating device design with water heating coil inside said first stage water tank and another duct type air heater is placed in the supply air stream after blower which is connected through an electric control circuit with a room thermostat, wherein when the heating mode is selected, the fan motor speed is switched to lower speed fan mode (or as pre set), and fan motor speed and air supply quantity is controlled either by a variable frequency drive or by using two speed motor (high & low) or two fans with two motors, the quantity of supply air for heating is pre-adjusted during the initial operation of unit.

4. The air cooler according to claim 1, wherein the electric control circuit comprises a room thermostat for cooling, heating and ventilation control and for a sequence of operation providing comfort for space users.

5. The air cooler according to claim 1, further comprising an automatic, self-cleaning tank that comprises a low voltage electrical motorized valve fixed on a water drainage pipe of said first stage water tank, and a valve actuator controlled by an electrical photo sensor activated upon sun rise and a motorized valve that opens, drains water and closes automatically for several preset minutes daily to drain a predetermined quantity of tank water.

6. The air cooler according to claim 1, wherein a control circuit of the device provides a sequence of operation during auto fan with the cooling or heating mode allowing first stage water pump to flush water over the first stage evaporative media continuously whenever the fan stops; wherein the operation of first stage water pump continues during the fan stop period to provide filtration and humidification to air entering through said air cooler in compensation for room or space exhausted air.

7. The air cooler according to claim 1, wherein using cooling coil embedded in second stage water tank, the coil can be a direct expansion refrigeration type coil connected to condensing section of a package chilled water unit or chilled water type coil connected to external chilled water system.

8. The air cooler according to claim 1, wherein water collection pans collect water leaving from said first stage evaporative cooling media and then directs it to the first stage water tank through distribution chambers; and wherein collected water leaving said second stage evaporative cooling media is directed to said second stage water tank.

9. The air cooler according to claim 1, wherein water collection pans collect water leaving from said first stage evaporative cooling media then directs it to the first stage water tank through distribution chambers; and wherein collected water leaving said second stage evaporative cooling media is directed to said second stage water tank.

10. The air cooler according to claim 1, wherein non-submersible inline or end suction type pumps are located outside the first and second water tanks to prevent electrical shock caused by submersible pumps.

11. The air cooler according to claim 1, wherein said air cooler is equipped with a single or multi speed fan motor or motor with variable frequency drives or speed regulator for models with specified pre adjusted fan speed or two fans for models with supply air flow modulations.

* * * * *